United States Patent Office 3,796,724
Patented Mar. 12, 1974

3,796,724
4-CARBOXY-2-SULFOBENZOIC ANHYDRIDE
Franz Scheidl, Gersthofen, Germany, assignor to Farbwerke Hoechst Aktiengesellschaft vormals Meister Lucius & Bruning, Frankfurt am Main, Germany
No Drawing. Filed May 12, 1972, Ser. No. 252,548
Claims priority, application Germany, May 15, 1971,
P 21 24 173.6
Int. Cl. C07d 89/06
U.S. Cl. 260—327 S                                                         1 Claim

ABSTRACT OF THE DISCLOSURE 4-carboxy-2-sulfobenzoic anhydride is prepared by dehydration of 2-sulfoterephthalic acid; the dehydration may be carried out in a thermal process or by means of dehydration agents. The anhydride is appropriate as starting material for the preparation of plastics, dyestuffs, pesticides, plant protection products and drugs.

---

The present invention relates to the sulfobenzoic anhydride substituted in 4-position by a carboxyl group which corresponds to the formula

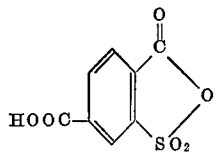

and to a process for the preparation of this anhydride.

The compound in accordance with the present invention is for example prepared by intramolecular dehydration of 2-sulfoterephthalic acid, which can be obtained according to U.S. Pat. No. 3,088,956. The dehydration may be carried out either by thermal processes, or using dehydration agents.

In the thermal dehydration process, the sulfoterephthalic acid is heated to a temperature above 150° C., preferably in the presence of a high-boiling solvent, i.e. a solvent having a boiling point of from about 150° to 250° C., as for example dichlorobenzenes, trichlorobenzenes, nitrobenzene, mesitylene, tetrahydronaphthalene, decahydronaphthalene, furthermore high-boiling gasolines. The dehydration may be carried out under normal or reduced pressure. The water which is formed is distilled off, optionally in an azeotropic mixture with the solvent used. Depending on the solvent employed, the 4-carboxy-2-sulfobenzoic anhydride obtained either remains in solution or precipitates for its more or less greater part in the form of crystals. The preferred solvent is 1,2,4-trichlorobenzene; the amount employed being from 5 to 25 moles per mole of sulfoterephthalic acid. The most advantageous reaction temperature for about 5 hours is in the range of from 170° to 210° C. While cooling, the 4-carboxy-2-sulfobenzoic anhydride precipitates in the form of crystals from the clear solution.

In the chemical dehydration process, the sulfoterephthalic acid is treated with dehydration agents, preferably with acetic anhydride or acetyl chloride, the molar ratio of sulfoterephthalic acid to dehydration agent being advantageously from 1:1.2 to 1:10, preferably 1:3. The dehydration may also be carried out employing phosphorus pentoxide, sulfur trioxide or oleum. Of course, the reaction may also be carried out in the presence of an inert solvent. When acetic anhydride or acetyl chloride is used, glacial acetic acid for example is an appropriate solvent. The advantage of this operation mode resides in the fact that in this case the amount of acetic anhydride or acetyl chloride needs exceeding the stoichiometrically necessary amount only slightly. The chemical dehydration is carried out at a temperature in the range of from 20° to 140° C., preferably at about 100° C. Also in this case, the desired anhydride generally precipitates in the form of crystals when the reaction mixture is cooled.

4-carboxy-2-sulfobenzoic anhydride melts at 208° to 210° C. (uncorrected) and sublimates under highly reduced pressure from about 150° C. on. It crystallizes in the form of colorless prisms and is scarcely soluble in benzene, chlorobenzene, methylene chloride and gasoline. At 25° C., 10 g. dissolve in 100 g. of glacial acetic acid, and 26 g. in 100 g. of acetic anhydride. The anhydride is also easily soluble in dimethyl formamide and in ethyl acetate.

Hydrolysis occurs rapidly when water, alcohols or amines are used, especially at elevated temperatures, and slow hydrolysis into sulfoterephthalic acid occurs when it is standing in air for longer periods.

The new compound is advantageously suitable for the preparation of high temperature resistant polymers which for their part may be used for the coating or impregnation of metal, paper, fiber fleeces or similar materials. Furthermore, the new compound may be used in syntheses in the dyestuff, pesticide and plant protection product, or the drug fields.

The following examples illustrate the invention:

EXAMPLE 1

246 g. (1 mole) of sulfoterephthalic acid (prepared according to U.S. Pat. No. 3,088,956) and 306 g. (3 moles) of acetic anhydride are heated to 100° C. for 4 hours. Subsequently, the obtained solution is cooled to room temperature, which cooling causes precipitation of colorless crystals. The product is suction-filtered, washed with methylene chloride and dried. Yield: 160 g. (0.7 mole) of 4-carboxy-2-sulfobenzoic anhydride having a melting point of from 208° to 210° C. Saponification number: 737 mg. KOH/g. (calc.: 738), molecular weight: 225 calc.: 228), percent C: 41.7 (calc.: 42.1), percent H: 1.9 (calc.: 1.8), percent S: 14.1 (calc.: 14.0).

By concentration of the filtration product to 50% by weight, further 30 g. of product are obtained.

Total yield: 190 g.=83% of the theoretical yield.

EXAMPLE 2

246 g. (1 mole) of sulfoterephthalic acid, 400 g. (6.7 moles) of glacial acetic acid and 153 g. (1.5 moles) of acetic anhydride are heated for 4 hours to 100° C.; the work-up is as indicated in Example 1.

Yield: 145 g. of colorless crystals having a melting point of 208°–210° C.

EXAMPLE 3

123 g. (0.5 mole) of sulfoterephthalic acid and 1089 g. (6 moles) of 1,2,4-trichlorobenzene are heated for 5 hours to 170° to 210° C., whereby 9 g. of water are distilled off. While cooling the solution to room temperature, the 4-carboxy-2-sulfobenzoic anhydride precipitates. It is suction-filtered, washed with methylene chloride and dried. A grey substance in the form of crystals having a melting point of 205° to 208° C. is obtained.

Yield: 102 g.=90% of the theoretical yield.

For a further purification, the product is recrystallized from glacial acetic acid. The melting point is now from 208° to 210° C.

EXAMPLE 4

246 g. (1 mole) of sulfoterephthalic acid, 108 g. (1.5 moles) of acetyl chloride and 400 g. (6.7 moles) of glacial acetic acid are heated to 100° C. in a flask with reflux condenser mounted on its top. After 4 hours at this temperature, the formation of hydrochloric acid ceases. About 50% by volume of the solvent are then distilled off, thus removing excess acetyl chloride from the reaction mixture, and subsequently, the solution is allowed to cool. The 4-carboxy-sulfobenzoic anhydride precipitates as a mass of crystals. The further work-up is as indicated in Example 1.

Yield: 188 g. of product having a melting point of from 208° to 210° C.

EXAMPLE 5

A polymer resin for impregnation purposes is prepared as follows:

182.4 g. (0.8 mole) of 4-carboxy-2-sulfobenzoic anhydride and 79.2 g. (0.4 mole) of 4,4'-diamino-diphenyl-methane are heated in a flask provided with an agitator in the presence of 400 ml. of N-methyl-pyrrolidone and 110 ml. of toluene, the temperature being raised until at a final temperature of 180° C. dehydration is complete. The mixture is cooled to 120° C., at which temperature 39.8 g. (0.1 mole) of 4,4'-bis(ethoxyalylamino)-diphenyl-methane are added, the whole is then cooled to 100° C., and 2.5 ml. of triethylamine are added to the reaction mixture. Homogenization is carried out at 100° C. for 10 minutes, subsequently 125 g. (0.5 mole) of 4,4'-di-iso-cyanato-diphenyl-methane are introduced with agitation. The mixture is heated for 2.5 hours to 120° C., the temperature is slowly raised to 200° C., which temperature is maintained for 6 hours, the solvent is then distilled off, and the reaction product is allowed to cool completely. A dark brown resin-like polymer is obtained.

The inherent viscosity of a 0.5% solution in N-methyl-pyrrolidone at 20° C. is 0.28.

Paper strips are impregnated with a 1% solution of the polymer in N-methyl-pyrrolidone, and these impregnated strips may be used as dielectric in condensers.

EXAMPLE 6

Polymer resin for wire insulation

First, 4-carboxy-2-sulfobenzoic anhydride is converted into the acid chloride by reaction with thionyl chloride (boiling point 163–166° C. at 0.1 mm. Hg, melting point 83° C.). Subsequently, 24.7 g. (0.1 mole) of the acid chloride and 19.8 g. (0.1 mole) of 4,4'-diamino-diphenyl-methane are introduced within 30 minutes in portions, while cooling (maximum temperature 20° C.), into a flask provided with agitator, in which 190 ml. of dimethyl-acetamide are already present. A viscous solution is obtained. In order to eliminate the hydrochloric acid, liquid ethylene oxide is added, and subsequently agitation is continued at 50° C. for 2 hours and at 25° C. for another 2 hours. The solution so obtained is introduced into 200 ml. of acetone, thus forming a sticky paste. 2000 ml. of water are added to this paste, which results in the obtention of a yellow-brown powder which is suction-filtered and washed with water in order to liberate it from acid. The product has an acid number of 102 (mg. KOH/g. of substance); the inherent viscosity of a 0.5% solution in dimethyl-acetamide at 20° C. is 0.41.

A 20% solution of this powder in dimethyl-formamide is applied on a wire coating machine (8 passages) to a copper wire having a thickness of 0.8 mm. Drying is carried out at 150° C. A clear, flexible coating is obtained which does not crack or chip off even when the wire is repeatedly folded.

What is claimed is:
1. 4-carboxy-2-sulfobenzoic anhydride of the formula

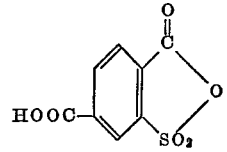

References Cited

Gilman (Ed.), Organic Syntheses, Coll., vol. I, 1941, pp. 495–7.

HENRY R. JILES, Primary Examiner

C. M. S. JAISLE, Assistant Examiner

U.S. Cl. X.R.

260—79.3 R